Aug. 12, 1924.
M. LEFF
1,504,562
AUTOMOBILE DOOR
Filed Feb. 10, 1923
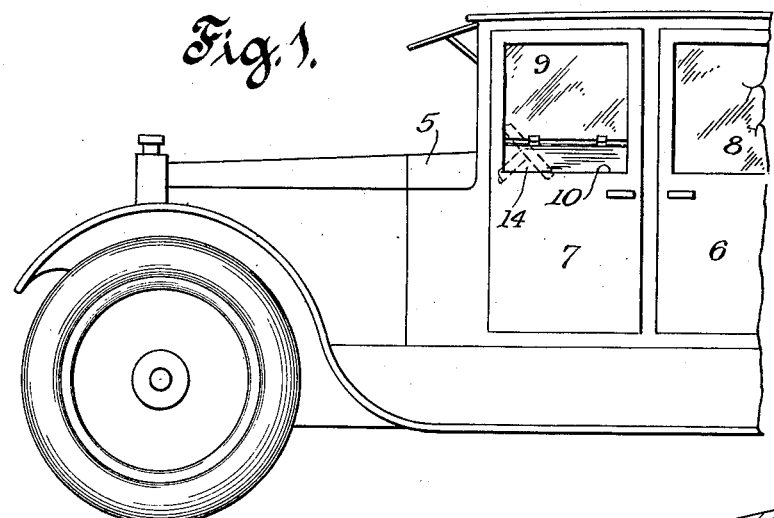
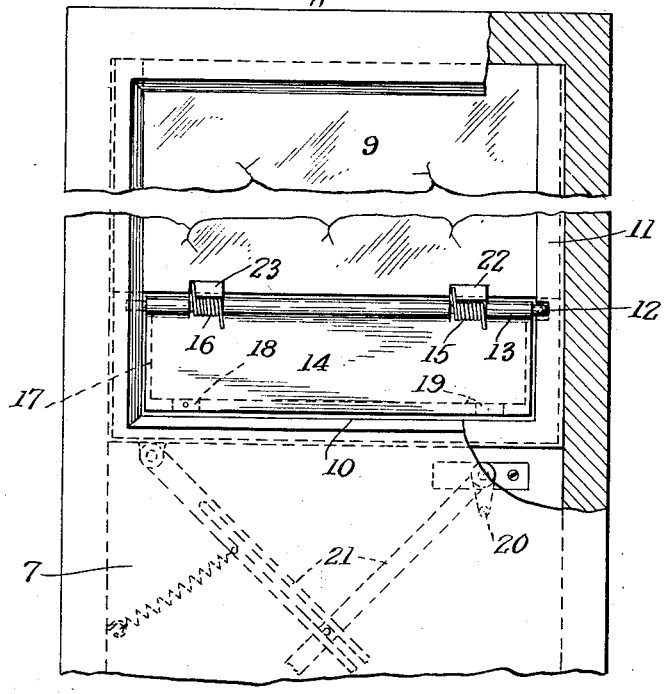
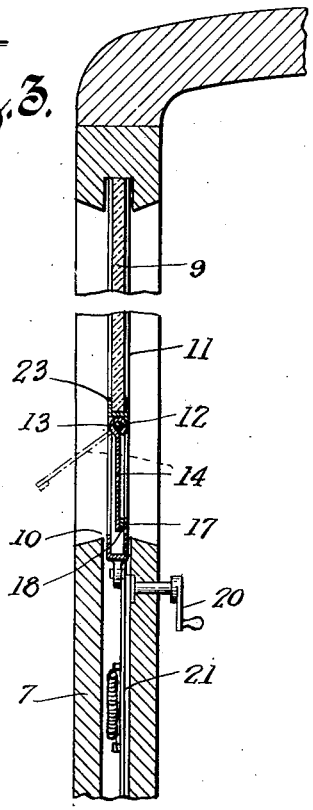
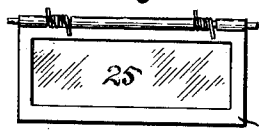
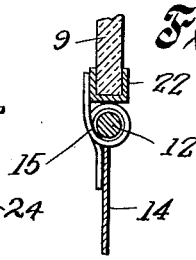
INVENTOR
Morris Leff
BY
Arthur Phelps Marr
ATTORNEY Patented Aug. 12, 1924.

1,504,562

UNITED STATES PATENT OFFICE.

MORRIS LEFF, OF NEW YORK, N. Y.

AUTOMOBILE DOOR.

Application filed February 10, 1923. Serial No. 618,252.

*To all whom it may concern:*

Be it known that I, MORRIS LEFF, a citizen of the United States, and resident of the borough of Manhattan, city, county, and State of New York, have invented certain new and useful Improvements in Automobile Doors, of which the following is the specification.

The device, the subject of this invention is an attachment adapted to form a part of and to operate in, conjunction with the glass in the door of an automobile.

Automobilists find it advantageous and in many municipalities it is made legally necessary that the driver of a vehicle, indicate by a signal given with the hand and arm, the intention to change the course in either direction, to stop, back or proceed. While mechanical signals of more or less complicated design have been invented for transmitting such signal indications, the use of the hand and arm is, by all means, most sure and most satisfactory.

The drivers of enclosed vehicles and especially of the coupe, limosine or sedan type, find it inconvenient to use the hand and arm in signalling and where the law requires that such signals be given, it is necessary to open and leave permanently open, one window of the automobile, with the consequent discomfort to the driver and the occupants and it is to make hand and arm signals possible and yet to overcome the discomfort of an open window that I have designed and constructed the device which I am about to describe. It should be borne in mind, however, that while I will describe my invention as applied to the window or glass insert in the door, my device may be made a part of and may operate with full efficiency in a window set into the body of the vehicle and not forming a part of the door.

The following is what I consider a good means of carrying out my invention and the accompanying drawing should be referred to for a complete understanding of the specification which follows:—

In the drawing:—

Fig. 1, is a fractional view of an automobile.

Fig. 2, a view in side elevation, partly in section showing the door on a large scale.

Fig. 3, a sectional view at approximately mid-width the door and parts adjacent thereto.

Fig. 4, a detailed sectional view on an enlarged scale.

Fig. 5, is a front elevation of a modification.

Similar reference numerals indicate like parts in all the figures where they appear.

At 5, I show a part of an automobile of the enclosed four-door type and at 6 and 7, I show two doors, side by side, both of which are arranged at one side, the left side of the automobile shown in Fig. 1.

The door 7, the forward door, is the one through which the driver of the car usually passes and it is in this door that I have arranged my device. As shown at 8 and 9, each door is provided with a glass portion or insert. The glasses may be raised or lowered in a manner well understood. The glass 9 does not fill the entire aperture 10, but this glass is received in a frame 11 and is secured therein, and in this frame 11 and under the lower edge of the glass 9, I place a bar or pin 12, which serves as a pintel for the hinge 13.

The hinge 13 is formed integral with the plate 14 and the plate 14 is arranged in the frame 11, filling that space in the aperture 10, not occupied by the glass 9. Springs 15 and 16 tend to retain the plate or shutter member 14 in the glass aperture and will return the shutter member to a closed position, when this member is moved out of such position.

The frame 11 is provided with an inwardly projecting flange 17, against which the plate of shutter 14 is adapted to close and I may provide bumpers as shown at 18 and 19, making these bumpers of felt or rubber, to receive the shock of the closing shutter, when this shutter is closed by means of the springs 15 and 16. I call particular attention to the fact that the shutter 14 when closed, forms a part of the completed window, occupying no greater space than the glass would occupy, were this window formed wholly of glass. This is necessary to allow the window to be raised or lowered in the customary manner, the raising and lowering being accomplished by the crank 20, operating any suitable device, such as a lazy-tong arrangement as shown at 21 in Fig. 2.

The shutter 14 operates outward, that is the lower edge may be moved outward by pressure of the hand and arm and when in the outward position, this shutter acts as a shed, preventing rain or snow blowing into the vehicle and to a great extent, shielding the arm of the operator. When the arm is withdrawn, the shutter will close by reason of the normal action of the springs 15 and 16.

As previously stated, a shutter member such as I have described may be formed in any window, whether or not that window be a part of the door. The size of the shutter and more especially the width may be varied to meet any regular or special requirements and other modifications may be made within the scope of the appended claims, without departing from the principle or sacrificing the advantages of the invention.

I prefer that the glass should be provided with clips as shown at 22 and 23, to receive one end of the springs 15 and 16, however, a complete strip of metal or other suitable material may be arranged the full length of the lower edge of the glass 9.

In Fig. 5, I show a shutter having an arm 24 and a glass insert 25. This shutter will serve as does the shutter 14, with the added advantage of admitting light and being somewhat more decorative.

Having carefully and fully described my invention, what I claim and desire to obtain is:—

A window for vehicle doors comprising a frame arranged in said door, a glass in said frame and of less than the total length of said frame, a pivot pin supported in said frame and extending the full length of one edge of said glass, a shutter hingedly supported upon said pivot pin, said shutter comprising a frame having a glass therein, means for retaining said shutter closed, said means comprising coiled springs arranged upon said pivot pin and clips engaged upon the free edge of the first said glass, for receiving one end of said springs.

Signed at the city, county and State of New York, this 2d day of February, 1923.

MORRIS LEFF.